Patented Mar. 28, 1939

2,152,308

UNITED STATES PATENT OFFICE 2,152,308

METHOD OF PREVENTING INFILTRATION IN WELLS

John J. Grebe, Midland, Mich., assignor to The Dow Chemical Company, Midland, Mich., a corporation of Michigan No Drawing. Application June 24, 1937, Serial No. 150,132

8 Claims. (Cl. 166—21)

This invention relates to methods of shutting off water infiltration in oil and gas wells, wherein a solution of a reagent is introduced into the formation to produce a precipitate by reacting with the water or with the dissolved constituents thereof. It more particularly concerns an improved method of forming a plugging deposit in the formation, effectively reducing its permeability to the passage of water without materially reducing its permeability to oil.

It is an object of the invention to provide a method of forming a precipitate in earth or rock formations resistant to water or brine infiltration which more effectively resists displacement than precipitates heretofore proposed for the purpose. Other objects and advantages will appear as the description proceeds.

These objects I have found may be realized by introducing into the well an aqueous solution comprising a water-soluble soap and a water-soluble aluminate, under a pressure in excess of that in the water-bearing formation, allowing time for the solution to penetrate the formation, and then releasing the pressure. By this method the flow of water into a well may be substantially prevented without materially hindering the flow of oil, since the solution is inert to oil.

In carrying out a treatment, according to the invention, a solution is prepared by dissolving a soluble soap, such as sodium palmitate, sodium stearate, or like soap formed from a fatty acid and an alkali-metal base, and a soluble aluminate such as sodium or potassium aluminate. A considerable variation in the concentration of either the soap or the aluminate in the solution employed is allowable. For example, a solution containing from 10 to 50 per cent of soap and from 2 to 10 per cent of aluminate has been found satisfactory, the proportions of the soap being preferably in excess of that of the aluminate. A generally effective solution is one comprising approximately 40 per cent by weight of the potassium soap of cocoanut oil and approximately 4 per cent by weight of sodium aluminate, the balance being water. Other common soaps, e. g. sodium stearate, palmitate, oleate, and the like, may be substituted for the soap mentioned.

Before introducing the solution, it is generally desirable to remove any brine from the bore of the well and flush it out with water. Some water or oil may be advantageously introduced into the well under a pressure in excess of that in the water-bearing formation to cause it to enter the formation ahead of the solution to be later introduced. The solution is introduced into the well and forced into the formation by the application of pressure in the usual manner. The solution is allowed to remain in the formation by holding the injection pressure to permit the reagent to react with the ground water or dissolved salts therein forming a water-insoluble precipitate or deposit in the water-bearing pores. After a sufficient period of time, e. g. from 5 to 15 hours, the pressure is released and any excess solution may be removed by pumping or bailing.

The introduction into a formation wet by brine or hard water of a solution of the type described has the advantage of producing a precipitate which is not as readily displaced from the formation as that produced by either a soap solution or soluble aluminate solution when the pressure is released. It has the further advantage of being selective in its action because the solution does not form clogging deposits in contact with oil.

Other modes of applying the principle of my invention may be employed instead of those explained, change being made as regards the method herein disclosed, provided the step stated by any of the following claims or the equivalent of such stated step be employed.

I therefore particularly point out and distinctly claim as my invention:

1. In a method of treating water-bearing formations adjacent the bore of an oil or gas well, the step which consists in introducing into the well a treating solution comprising a water-soluble aluminate and a water-soluble soap.

2. In a method of treating water-bearing formations adjacent the bore of an oil or gas well, the step which consists in introducing into the well a treating solution comprising a water-soluble aluminate and a water-soluble soap, the proportion of soap in the solution being in excess of that of the aluminate.

3. In a method of treating water-bearing formations adjacent the bore of an oil or gas well, the step which consists in introducing into the well an aqueous treating solution comprising sodium aluminate and a water-soluble soap.

4. In a method of treating water-bearing formations adjacent the bore of an oil or gas well, the step which consists in introducing into the well an aqueous treating solution comprising approximately 2–10 per cent by weight of an alkali-metal aluminate and approximately 10–50 per cent by weight of a water-soluble soap, the soap being in excess of the aluminate.

5. In a method of treating water-bearing earth or rock formations adjacent the bore of an oil or gas well, the step which consists in introducing into the well an aqueous treating solution comprising approximately 4 per cent of sodium aluminate and approximately 40 per cent by weight of a water-soluble soap.

6. In a method of treating water-bearing formations adjacent the bore of an oil or gas well, the step which consists in introducing into the well under a pressure in excess of that in the water-bearing formation a treating solution comprising an alkali-metal aluminate and a water-soluble soap.

7. In a method of treating water-bearing formations adjacent the bore of an oil or gas well, the steps which consist in introducing into the well under a pressure in excess of that in the water-bearing formation a quantity of water and an aqueous solution comprising an alkali-metal aluminate and a water-soluble soap.

8. In a method of treating water-bearing formations adjacent the bore of an oil or gas well, the steps which consist in introducing into the well under a pressure in excess of that in the water-bearing formation a treating solution comprising an alkali-metal aluminate, a water-soluble soap and then a quantity of oil.

JOHN J. GREBE.